United States Patent [19]

Baker et al.

[11] Patent Number: 5,291,614
[45] Date of Patent: Mar. 1, 1994

[54] REAL-TIME, CONCURRENT, MULTIFUNCTION DIGITAL SIGNAL PROCESSOR SUBSYSTEM FOR PERSONAL COMPUTERS

[75] Inventors: Robert G. Baker, Delray Beach; Bradley J. DeBauche, Boca Raton; Chris Dombrowski, Delray Beach; Eric Jensen, Boca Raton; Lloyd H. Massman, Delray Beach; Melvin McCain, Boca Raton; Paul R. Swingle, Delray Beach, all of Fla.

[73] Assignee: International Business Machines Corporation, Armonk, N.Y.

[21] Appl. No.: 753,505

[22] Filed: Sep. 3, 1991

[51] Int. Cl.⁵ ............................................. G06F 9/00
[52] U.S. Cl. .................................. 395/800; 364/281.3
[58] Field of Search ............... 395/275, 250, 325, 650, 395/800

[56] References Cited

U.S. PATENT DOCUMENTS

4,009,470  2/1977  Danilenko ..................... 364/DIG. 1
4,075,691  2/1978  Davis ............................ 364/DIG. 1
4,228,495  10/1980  Bernhard ..................... 364/DIG. 1

Primary Examiner—David Y. Eng
Attorney, Agent, or Firm—George E. Grosser; Douglas R. McKechnie

[57] ABSTRACT

A personal computer system includes a digital signal processor (DSP) subsystem that is connectable to a plurality of application specific hardware devices. A single DSP is operable under a DSP real-time operating system (RTOS) to concurrently handle a plurality of different signal processing functions on a real-time basis. A DSP data store is connected to the DSP and to the personal computer and includes addressable locations that emulate addressable I/O registers associated with the application specific hardware devices to enable the personal computer to run a plurality of application programs controlling operation of the hardware devices. Performance is enhanced for I/O read and write operations by delaying halting of the DSP allowing such operations to complete in a cycle during which the DSP is not accessing the data store.

6 Claims, 8 Drawing Sheets

REAL-TIME, CONCURRENT, MULTIFUNCTION DIGITAL SIGNAL PROCESSOR SUBSYSTEM FOR PERSONAL COMPUTERS

FIELD OF THE INVENTION

This invention relates to the field of data processing, and, more particularly, to an improved, general-purpose digital signal processor (DSP) subsystem for a personal computer, which subsystem is capable of concurrently executing multiple, unrelated signal processing functions on a real-time basis to emulate multiple hardware adapters.

RELATED PATENT

U.S. Pat. No. 4,991,169- Davis et al, for "REAL-TIME DIGITAL SIGNAL PROCESSING RELATIVE TO MULTIPLE DIGITAL COMMUNICATIONS CHANNELS", assigned to the assignee of the present invention, discloses a DSP subsystem in which two single threaded DSPs operate in parallel executing similar or related functions. Each DSP uses an instruction set similar to that of the present invention. Each DSP further has a cycle steal mode of operation (see column 11 of patent) in which DSP operations are halted allowing data to be transferred between the DSP and a personal computer (PC). The present invention is designed to improve upon such prior art system by handling multiple dissimilar functions and improving data transfer efficiency by delaying DSP halting for a preset number of cycles in expectation that certain DSP operations will occur to allow the data transfer to complete without halting.

BACKGROUND OF THE INVENTION

Digital signal processing is a specialized form of data processing in which digitally represented signals are subjected to rapid, mathematically intensive, repetitive operations where speed is of prime importance. Such operations are executed in a DSP that is specifically designed to execute mathematical algorithms. A DSP commonly includes an arithmetic logic unit (ALU) and a parallel multiplication unit for performing mathematical operations in a single cycle. A DSP may also be supported by both a data store and an instruction store that are accessed in parallel over separate busses to simultaneously transfer both data and instructions so as to avoid memory and bus bottlenecks.

Digital signal processors are used for functions requiring very fast manipulation of numbers, as opposed to data transfers, string operations, or data block handling. A DSP is commonly dedicated to a specific purpose made up of plural tasks. Examples of tasks include: a) Echo cancellation in modem applications; b) Finite impulse response and infinite impulse response filters with fixed coefficients; c) Adaptive filters with time-varying coefficients; and d) Fast Fourier transforms.

Heretofore, DSPs have been used for application specific, digital signal processing functions in which a given DSP is used for only one specific purpose. Plural DSPs have been connected in parallel, each performing a single related task. Two articles summarize the current state-of-the-art of DSPs, the articles being, "Real-time digital signal processing: a review of applications and technology", by A. G. Carr, Computing and Control Engineering Journal, March 1990, pages 77–80, and, "Recent Advances in DSP Systems", by H. M. Ahmed and R. B. Kline, IEEE Communications Magazine, May 1991, pages 32–45. Such articles note that programmable DSPs can be used with application specific hardware whereby a given DSP can be connected to perform a single, application specific digital signal processing function.

An article entitled "The NeXT Computer", by T. Thompson and N. Baran, BYTE Magazine, November 1988, pages 158–175, describes a personal computer having a general purpose DSP on a chip which can be programmed to tailor the chip for a specific purpose. Such system differs from the invention in the following ways. First, the DSP is tailored for a single function. Concurrent or multifunctions are not executed. Second, manual intervention appears to be needed to change over to a different application. Third, specific hardware adapters are required for each function.

SUMMARY OF THE INVENTION

The inventors have noted that DSPs can be constructed in accordance with current technology to have a bandwidth higher than that required for a single function or application. A high speed, programmable DSP can handle plural unrelated or dissimilar applications on a multitasking basis and not be limited to a single threaded process or single function as in the prior art.

The invention is embodied in a personal computer having a digital signal processing subsystem (DSPSS) that includes a DSP. Through real-time supervisory code, multiple concurrent operations are executed in a time-division-multiplexing fashion, allowing replacement of multiple individual-function feature cards in current usage.

One of the features of the invention is that it is capable of handling multiple digital signal processing functions at the same time up to the bandwidth of the signal processor, and such functions do not necessarily have to be similar. While this design can be dedicated to a single function (such as a CCITT V.32 standard modem engine), it can also be organized to provide multiple functions, e.g., slower speed V.22bis modem operations simultaneously with compressed voice playback. Some functions facilitated by this invention include modem communications at various speeds, speech and audio input and output, data and audio compression and decompression according to numerous standards, and encryption of data using various standards.

Another important feature of the invention is the provision of a real-time operating system (RTOS) which allows for a zero-frame count, enabling rapid changes in control which would not otherwise be available in a priority-based scheduling system. RTOS is composed of a scheduler, an interrupt handler, a queue manager, a task manager, a loader (for loading and patching code), and other assorted subsections. RTOS includes improvements in ordering of tasks through the creation of a 0-order to move certain important tasks to the highest priority, and intertask communications to allow multiple emulated ports to talk with each other, for example.

Still another design feature is transparent operation of the hardware and software of this DSPSS to emulate various devices. Hardware connections match as per defined standards, and operations involve no changes to application software or knowledge of the subsystem handling the data.

An additional design feature is the creation of the "non-HALT" data transfer mode, which improves program task execution times.

Another design feature of the invention is the ability to handle "off-line" batch types of data manipulation assignments in addition to "in-line" data stream functions. This feature allows the invention to serve either directly in the data flow, as when it operates as a communications port, or off the main data flow, as when it compresses or decompresses data going to storage or display devices.

Another useful aspect of the invention is the ability to enhance some of its features by increasing DSP memory size alone. For some tasks for which comparison is made to standardized tables or templates (for example, in speech processing functions), adding extra data memory loaded with appropriate information allows rapid operation at the speed of the DSP without changing clock speeds or replacing any key component. Furthermore, no parts are removed or discarded through this enhancement in capability. This feature is not available in non-programmable, hardware specific implementations.

Thus, one of the objects of the invention is to provide a DSPSS for a personal computer, which is operable to selectively perform at any given time one or more of a plurality of different digital signal processing functions.

Another object of the invention is to provide a DSPSS having a DSP and other hardware which allows plural application specific interfaces to be connected to the DSPSS so that different digital signal processing functions can be executed concurrently on a real-time basis.

A further object of the invention is to perform separate functions (for example, modem and bisynchronous communications) without adding multiple feature cards having individual addresses, interrupts and DMA channels.

Another object of the invention is to perform separate functions compatibly without duplicating all previous hardware. "Compatibly" is defined as operating in a fashion transparent to pre-existing application code and attaching to pre-established external electrical and mechanical interfaces.

A further object of the invention is to operate autonomously of a main system processor through a separate memory to provide buffering of I/O communications for more flexible data handling within the system.

DRAWINGS

Other objects and advantages of the invention will be apparent from the following description of a preferred embodiment of the invention, taken in connection with the accompanying drawings wherein.

DETAILED DESCRIPTION

Figure 1:
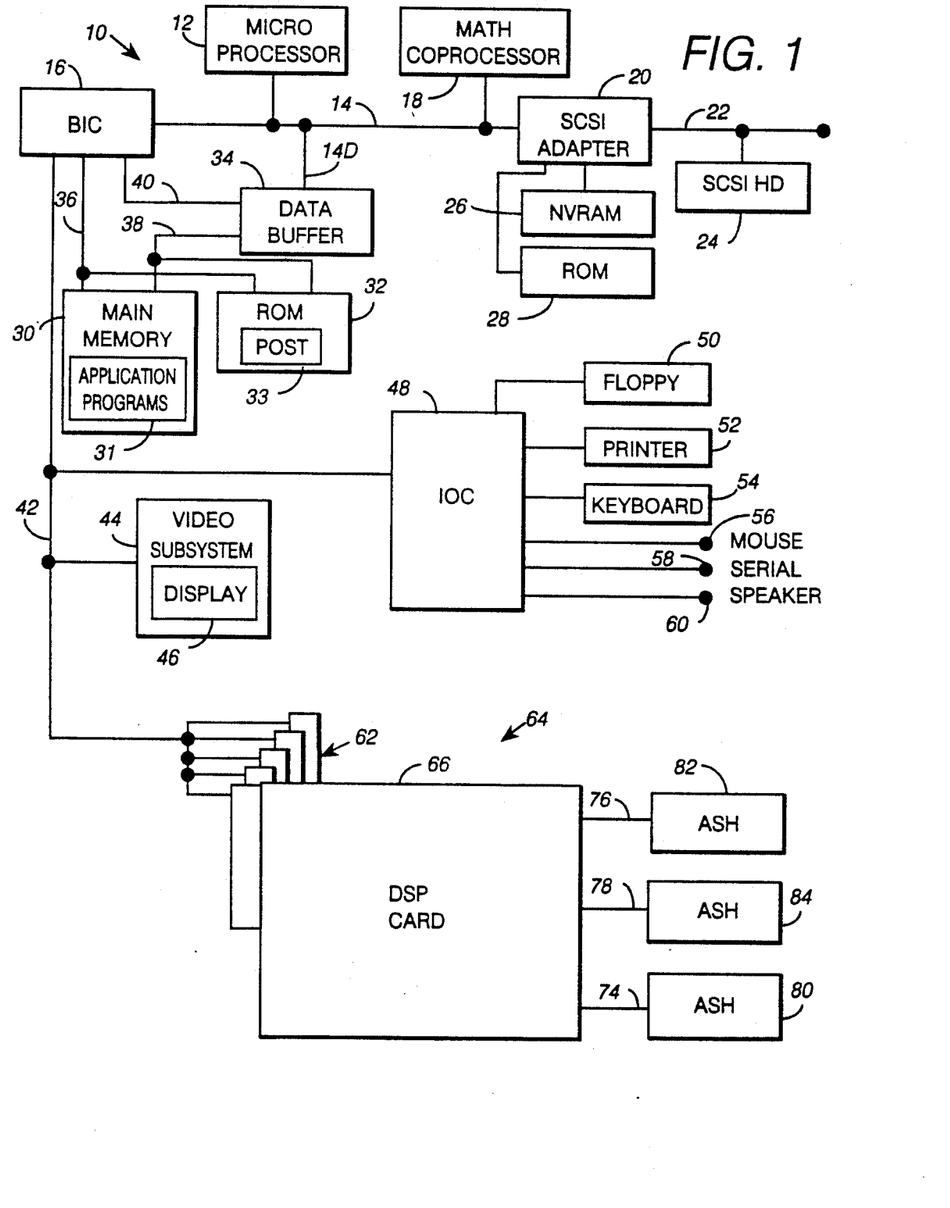
FIG. 1 is a block diagram of a personal computer embodying the invention.

Referring now to the drawings, and first to FIG. 1, there is shown an exemplary data processing system comprising a personal computer 10 operable under an operating system to execute application programs. Computer 10 comprises a microprocessor 12 connected to a local bus 14 which, in turn, is connected to a bus interface controller (BIC) 16, an optional math coprocessor 18, and a small computer system interface (SCSI) adapter 20. Microprocessor 12 may be one of the family of 80xxx microprocessors, such as an 80386 microprocessor, and local bus 14 includes conventional data, address, and control lines conforming to the architecture of such processor. Adapter 20 is also connected to a SCSI bus 22 to which is connected a SCSI hard drive (HD) 24 designated as the C:drive, the bus also being connectable to other SCSI devices (not shown). Adapter 20 is also connected to a non-volatile random access memory (NVRAM) 26 and to a read only memory (ROM) 28.

BIC 16 performs two primary functions, one being that of a memory controller for accessing a main memory 30 and a ROM 32. Main memory is a dynamic random access memory (RAM) that comprises a plurality of single, in-line, memory modules (SIMMS) and stores application programs 31 for execution by microprocessor 12 and math coprocessor 18. ROM 32 stores a power on self test (POST) program 33. POST program 33 performs the primary test, i.e. POST, of the system when computer 10 is restarted by turning the power on or by a keyboard reset. An address and control bus 36 connects BIC 16 with memory 30 and ROM 32. A data bus 38 connects memory 30 and ROM 32 with a data buffer 34 that is further connected to data bus 14D of bus 14. Control lines 40 interconnect BIC 16 and data buffer 34.

The other primary function of BIC 16 is to interface between bus 14 and an I/O bus 42 built in conformance with Micro Channel (MC) architecture. Bus 42 is further connected to a video subsystem 44 and to an input-/output controller (IOC) 48. Subsystem 44 includes a display 46. IOC 48 controls operation of plurality of I/O devices including a floppy disc drive 50 designated as the A:drive, a printer 52, and a keyboard 54. IOC 48 also is connected to a mouse connector 56, a serial port connector 58, and a speaker connector 60, which allow various optional devices to be connected into the system.

Bus 42 is also connected to a plurality of MC connectors 62. A DSPSS 64 can be configured as a feature card 66 that is plugged into one of connectors 62 and is thereby connected into the system through bus 42. Obviously, the DSPSS could also be connected directly to bus 42 or to bus 14. Card 66 has a plurality of ports which are respectively connectable by a plurality of cables 74, 76 and 78 to three application specific hardware (ASH) applications 80, 82 and 84. Such hardware would obviously be installed by the user of the system to perform desired digital signal processing functions or applications. DSPSS Referring to FIG. 2, DSP card 66 includes a DSP chip 90 mounted on the card, which in turn includes a DSP 92 and associated circuitry. The components that are mounted on the card directly are those located outside of the rectangle in FIG. 2 which represents chip 90 and inside of the lines representing card 66. Timing for the DSP is provided by an oscillator 93 and a phase generator 94 which divides the basic cycle of the oscillator into four phases. The data lines 42D of I/O bus 42 are connected to a chip data bus 95 through two way drivers 96 and latches 100. Incoming data is driven onto bus 95 over lines 98 and outgoing data is latched in latches 100 and driven from lines 102 onto data lines 42D.

Figure 2:
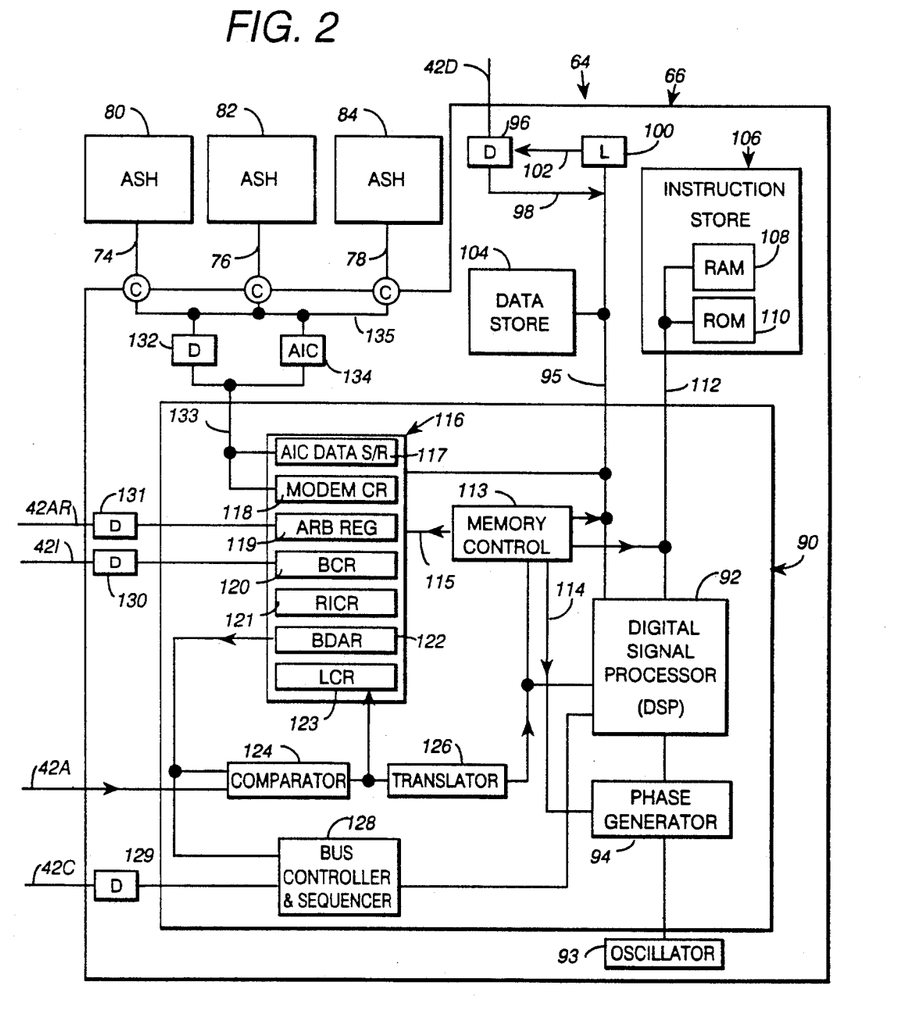
FIG. 2 is a block diagram of the DSP subsystem shown in FIG. 1.

A RAM data store 104 is connected to bus 95 for storing information including various data structures described hereinafter and the operands or data being read into and written from DSP 92. An instruction store 106, including a RAM 108 and a ROM 110, is connected by a bus 112 to DSP 92. The data store and the instruction store are thus arranged in the manner of the well known Harvard architecture for a DSP system, wherein data and instructions are concurrently transferred and fetched under the control of DSP 92 in parallel on separate, independent busses. Bus 112 is operated and controlled primarily by the DSP while bus 95 is shared by DSP 92 and processor 12 through bus 42. Programs for RAM 108 are first stored in data store 104 from bus 42D and then transferred or loaded from store 104 into RAM 108 for execution by DSP 92.

A memory control circuit 113 is connected to busses 95 and 112 to control accessing data store 104 and instruction store 106. Circuit 113 is also connected by lines 114 to phase generator 94 to allow coordination of the phase generation with accessing the stores and control of the phase generator for an extended cycle. Generator 94 can stretch clock cycles to accommodate slower ROM instruction fetching. Circuit 113 is also connected by lines 115 to a register array 116 to control accessing registers 117-123 in the array. The array is also connected to data bus 95 for transferring data into and out of the registers via bus 95. Registers 117-123 include appropriate conditioning circuits and store different data or information for different functional purposes as described hereinafter.

DSPSS 64 has the capability of responding to any range of I/O addresses under program control. A control program emulates all control fields. Data transfers to and from an I/O device or ASH, by I/O commands, are transparently transferred to or from data store 104. Locations in data store 104 are set up and predetermined to correspond to I/O addresses. A separate area is provided for I/O reads and I/O writes. On each I/O write command, an interrupt is generated to the DSP to notify emulation code that a command was issued. Under program control, an interrupt is generated for I/O read commands.

DSP 92 is interrupt driven and supports both simple processing with a minimum amount of interrupt overhead and fully asynchronous task processing with complete saving and restoring of the processor resources by software. DSP 92 is a parallel and pipelined horizontal processor which achieves maximum throughput of up to three distinct operations per cycle time. The operations include a memory transfer, an arithmetic or logical computation, and a multiplication.

Data bus 95 includes address lines that are shared by DSP 92 and I/O bus 42. When one of these elements drives the address lines of bus 95, the other is prevented from doing so. When bus 42 drives bus 95, control thereof is managed by sequencer 128. Bus 95 also includes data lines that are shared by I/O bus 42 and DSP 92. Data is transferred to and from DSP 92 for program loading of instruction store RAM 108 and to and from bus 42. Bus 112 also includes address and data lines, the latter being used primarily by the DSP to fetch instructions from instruction store 106. The address lines of bus 112 are used by DSP 92 for the selection of instructions to be transferred from store 106 into DSP 92.

Chip 90 also includes external digital control and analog interface support logic and logic for interfacing with bus 42, the former logic including modem control register 118, an analog interface control (AIC) shift register 117, AIC and analog logic 134, and TTL drivers 132. Logic 134 and drivers 132 respectively handle analog and serial digital signals, and are connected to a bus 135 that in turn is connected to cables 74, 76, and 78 through connectors C which form three ports for connection to the ASHs. Bus 135 carries both analog and digital signals where the specific signals used for any one port are determined by the specific pinout or line connections. Thus each port can be used as an analog port or as a serial digital port as desired. Modem control register 118 holds control and status bits, and register 117 is a shift-left and a parallel load-and-read register under the control of signals from AIC 134.

Arbitration register 119 is connected through drivers 131 to the arbitration lines 42AR of bus 42 and contains the arbitration information required by bus 42 for use in DMA transfers. When a DMA transfer is required, register 119 is loaded with an arbitration level and a DMA request bit. At the completion of arbitration, the request bit is reset. A bus control register (BCR) 120 is connected through drivers 130 to the bus interrupt lines 42I of bus 42. Register 120 contains latches for setting and resetting the interrupt request line and the channel check line of bus 42 under control of the DSP program. It also includes status bits indicating word or byte transfer and reflecting the condition of DMA controller terminal count, and a RETURN NOT READY bit that is automatically set by any decoded write command or a read command when an interrupt on read is enabled. It also includes a clock control bit for stretching the clock to accommodate slower ROM instructions.

Base device address registers (BDAR) 122 hold an emulation port compare address and control fields that the DSP and support hardware will respond to. It holds emulation compare bits allowing any I/O address field to be emulated, and emulation control range bits defining the range of the field that the DSP will respond to. A read interrupt control register (RICR) 121 contains information on which read I/O addresses will interrupt the DSP.

A last command register (LCR) 123 holds the last I/O address which caused an interrupt. This register is read only by the DSP and contains a POS/DSP decode bit, a last read/write indicator, and a field to trap the last I/O command. This register can only be read by DSP 92. LCR 123 contains POS/DSP decode bit which, when a read or write is issued to DSPSS 64 or when programmable option select (POS) is executed, is active for the specific I/O instruction. LCR also contains a last read/write indicator bit for reflecting the state of direction control. If the bit is one, the last I/O command which was issued was a write command.

Comparator 124 compares the emulation port address from BDAR 122 with the address on lines 42A of bus 42. If the address on lines 42A is in the range specified in BDAR 122, data is transferred as a read or write operation. Translator 126 converts I/O addresses from bus 42A into addresses in data store 104 and is controlled by sequencer 128 for gating the converted address onto the output address bus. Translator 126 is initialized by storing therein tables for mapping the I/O addresses into data store addresses.

DSP

Figure 3:
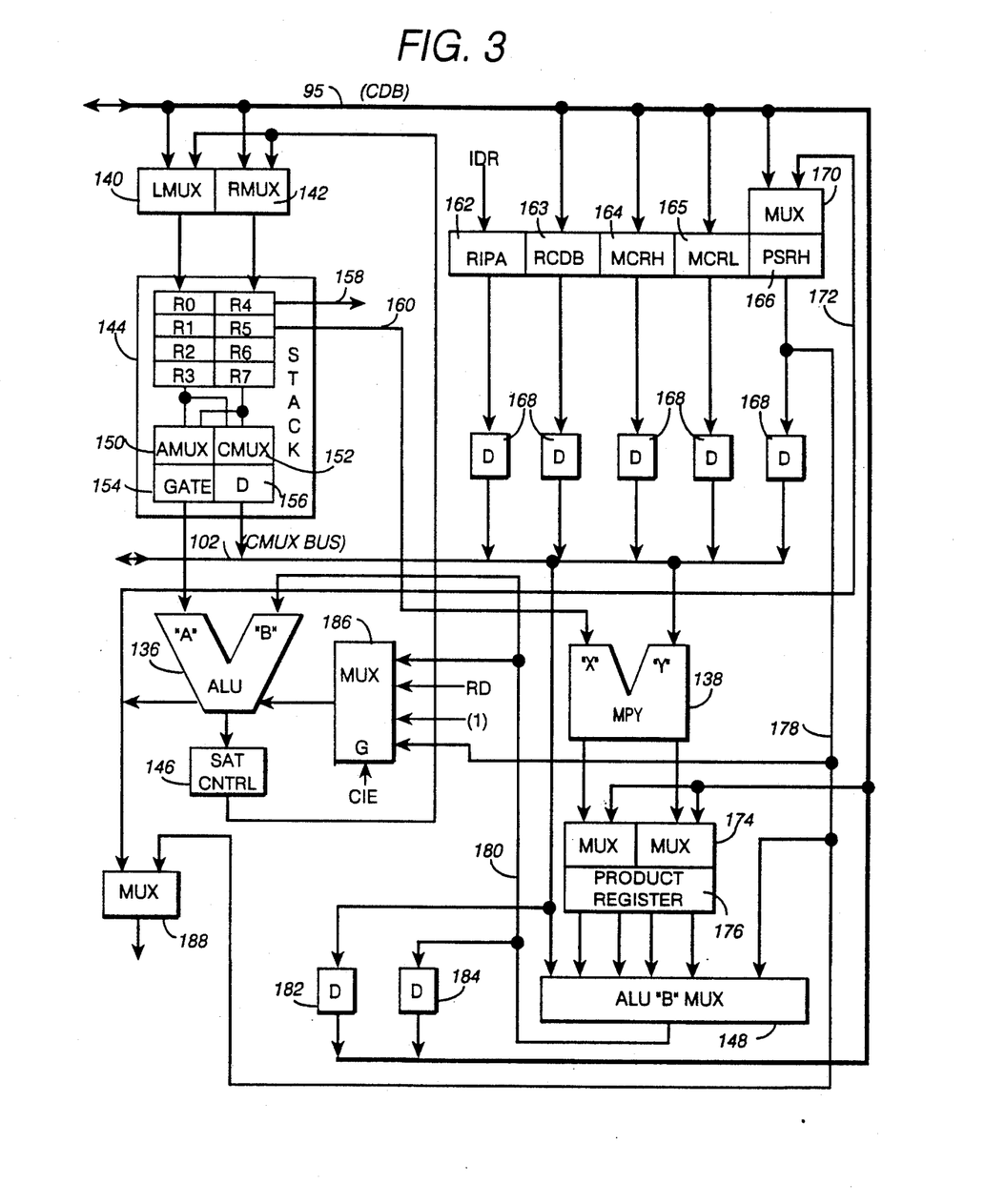
FIG. 3 is a block diagram of the DSP shown in FIG. 2, illustrating the general data flow therein.

DSP 9 is similar to the DSPs described in the above mentioned U.S. Pat. No. 4,991,169 and is designed to execute an instruction set of the same kind, so that only a brief description is provided herein. Referring to FIG. 3, bus 95 forms in DSP 92 a common data bus (CDB) having a sixteen bit wide data path for transferring data around the DSP. DSP 92 includes an arithmetic logic unit (ALU) 136 for performing adding, logic, and shifting operations, and a multiplication unit (MPY) 138 for performing multiplication in a single cycle. ALU 136 receives "A" and "B" operands, and MPY 138 multiplies "X" and "Y" operands to produce a thirty two bit result.

Figure 4:
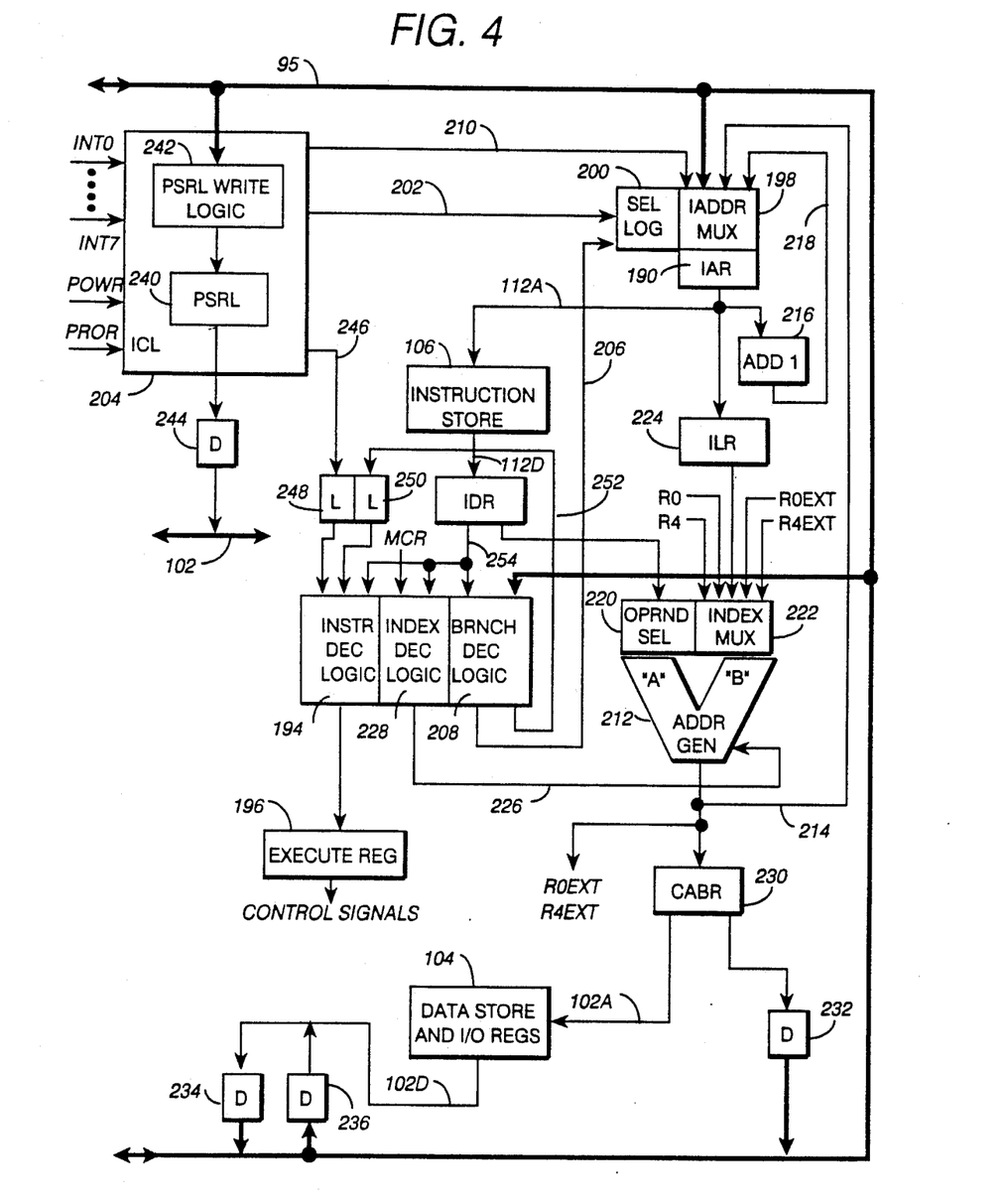
FIG. 4 is a block diagram of the DSP shown in FIG. 2 illustrating instruction sequencing and control components thereof.

The remaining items shown in FIG. 3 are principally concerned with moving the various operands into, around and out of ALU 136, MPY 138 and DSP 92. More specifically, an LMUX 140 and a RMUX 142 have inputs connected to CDB 95 and to a saturation (SAT) control circuit 146 which receives the sum or results from ALU 136. Thus operands from either 95 or 136 can be moved through MUXes 140 and 142 into a stack 144. The general functions of stack 144 are to input "A" operands into ALU 136, place results on CMUX bus 102, feed an operand to the address generator discussed with reference to FIG. 4, and feed an "X" operand to MPY 138. Stack 144 comprises a plurality of paired, general purpose registers R0-R7 from which operands can be selectively fed into an AMUX 150 and a CMUX 152. The output of 150 is fed through a gate 154 into ALU 136. The output of CMUX 152 if fed through a driver (D) 156 onto bus 102. Registers R0 and R4 are connected by lines 158 to address generator 212 (FIG. 4). Register R5 is connected by lines 160 to the "X" operand input of MPY 138.

A plurality of status registers 162-166 have their outputs connected through a plurality of drivers 168 to bus 102. Register 162 receives a RIPA operand from instruction decode register (IDR) 112D. Registers 163-166 respectively store RCDB, MCRH, MCRL, and PSRH operands which are inputted from bus 95. Register 166 is connected to a MUX 170 which has one set of inputs connected to bus 95 and other inputs connected to lines 172. MPY 138 has its "Y" operand input connected to bus 102 so that the "Y" operand can come from a plurality of different sources. The output of MPY 138 is fed into MUXes which in turn have second inputs connected to bus 95. MUXes 174 feed a thirty two bit product register 176 having four outputs connected to inputs of MUX 148. MUX 148 also has inputs connected to lines 178 and to bus 102. The output of MUX 148 is fed via lines 180 to the "B" operand input of ALU 136.

A pair of drivers 182 and 184 are respectively connected at their inputs to bus 102 and lines 180 and drive signals therefrom onto bus 95. Line 180 is also connected to an input into MUX 186 along with other inputs from lines 178, rounding bit RD (multiply result of zero, overflow, negative, positive), and an increment of (+1). A gating signal CIE controls which input is gated from MUX 186 into ALU 136 to handle carries. The ALU is also connected to lines 178 to feed signals to MUX 174 and to a MUX 188. MUX also has an input connected to lines 178 and produces an output that is fed to the branch and decode logic.

Referring to FIG. 4, the instruction sequencing and control portion of DSP 92 comprises an instruction address register (IAR) 190 connected to the address bus 112A of bus 112 so as to transmit instruction addresses to instructions store 106. Instructions are transmitted on data bus 112D of bus 112 and stored in an instruction data register (IDR) 192. IDR 192 is further connected to instruction decode logic 194 which decodes each instruction and sets up an execute register 196 so as to generate control signals appropriate to executing each instruction as it is decoded. IAR 190 receives each instruction address through an instruction address (IADDR) MUX 198 under the control of a selection logic (SEL LOG) circuit 200 that handles interrupts and branching. Circuit 200 receives control signals on a line 202 from interrupt control logic (ICL) 204 and on a line 206 from branch decode logic 208. MUX 198 receives addresses from bus 95, ICL 204 via line 210, an address generator (ADDR GEN) adder 212 via line 214, and an adder 216 by line 218. Adder 212 increments the address outputted by IAR 190 and feeds the new address back into IAR 190 through MUX 198.

Adder 212 has two operand inputs "A" and "B" which receive operands respectively from an operand selector 220 and an index MUX 222. Selector 220 is connected to receive operands from IDR 192. MUX 222 receives operands selectively from an instruction link register (ILR) 224, registers R0 and R4 and register extensions R0EXT and R4EXT. ILR 224 is connected to the output of IAR 190. Adder 212 is further connected by line 226 to index decode logic 228 which allows indexed jumps. Line 214 is further connected to transmit signals thereon to a common address bus register (CABR) 232 and to R0EXT and R4EXT. CABR 232 has its outputs connected to a driver 232 for driving signals onto bus 95, and to data store 104 via the address bus 102A of bus 102. Data store is further connected to by data bus 102D to drivers 234 and 236 providing a two way data transmission between busses 95 and 102.

ICL 204 includes a processor state register low (PSRL) 240 which receives data from PSRL write logic 242 and outputs data via a driver 244 onto CMUX bus 102. Logic 242 is connected to bus 95 to receive data therefrom. ICL further receives as inputs interrupt signals INT0-INT7, a power on signal POWR, and a multiply product overflow signal PROR. The interrupt control is very important to concurrently executing plural functions and is discussed in greater detail hereinafter. ICL 204 is connected by line 246 to a latch 248 having an output further connected into logic 194. A second latch 250 is also connected to logic 194 and has an input from line 252 which is connected to the output from logic 208 to provide feedback therefrom. IDR 192 is connected by lines 254 as inputs into each of logics 194, 228, and 208. Logic 228 also receives an input signal from MCR 164, 165.

I/O READ/WRITE

Figure 5:
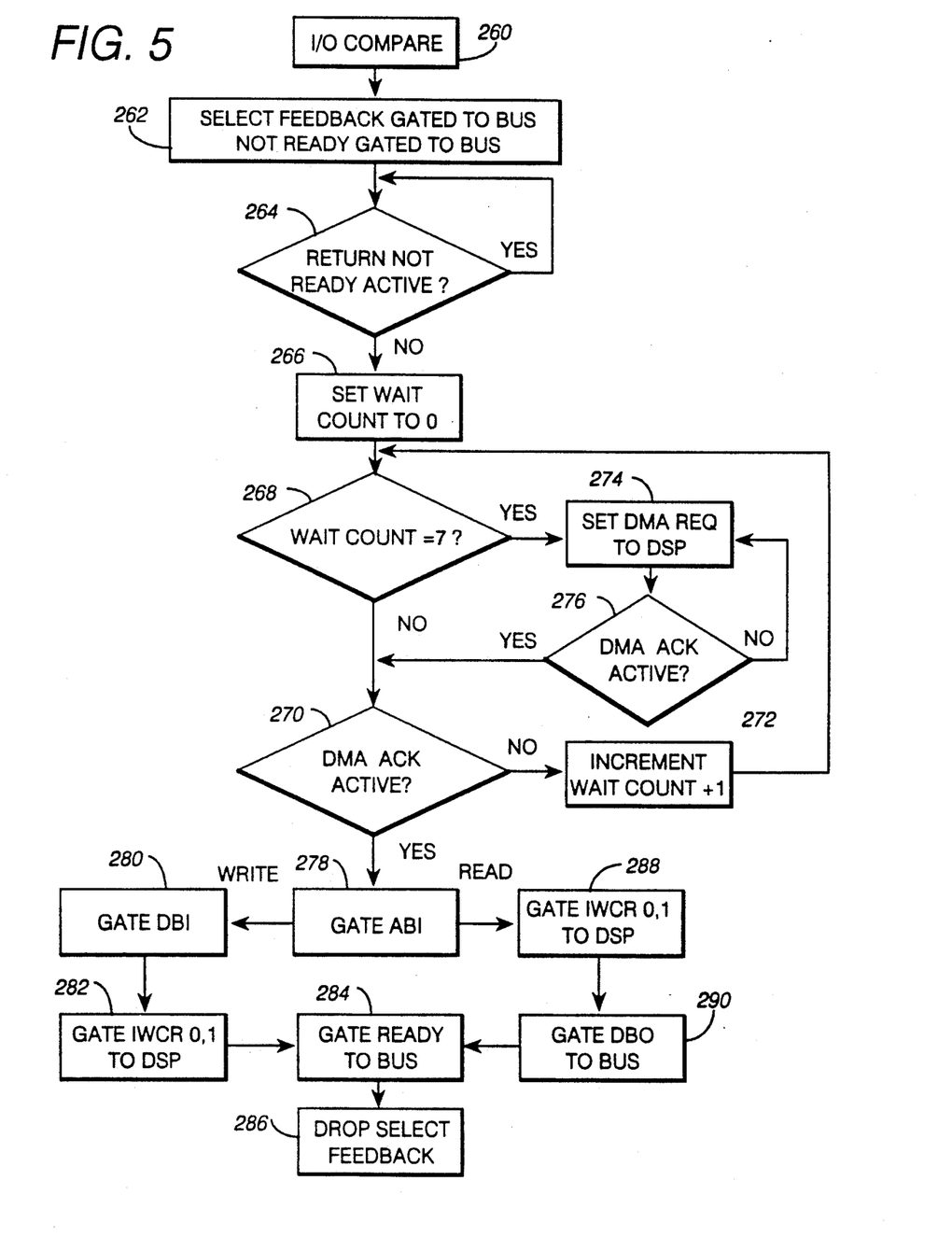
FIG. 5 is a flow chart illustrating how PC read/write operations occur without halting the DSP.

Referring to FIG. 5, when the PC issues an I/O read or write command to the DSPSS, step 260 makes a comparison between the I/O address from bus 42 and the address ranges in the DSPSS to detect valid addresses therein. In response to detecting a valid address, step 262 then gates a "select feedback" signal and a "not ready" signal to the bus in accordance with the Micro Channel architecture. In step 264, so long as a "return not ready" signal is active, step 264 loops on itself until such signal becomes inactive whereupon step 266 sets a "wait count" to zero. Step 268 then determines if the "wait count" has reached a preset value of seven to establish a maximum number eight of delayed cycles before the DSP will be halted. So long as the "wait count" is not seven, step 268 branches to step 270 which checks to see if the "DMA acknowledge" signal is active. If it is not, then a branch is made to step 272 which increments the wait count by one and branches back to step 268 to establish a loop that so long as the DMA acknowledge signal is inactive continues until the wait count equals seven and then a branch is made to step 274. Step 270 provides cycle timing for incrementing the wait count once each DSP cycle. During the course of a DSP cycle, which as previously indicated is divided into four phases, a determination is made e.g. in phase three as to whether the next cycle will involve the data store. If the data store is not to be used on the next cycle, the DMA ACK signal is set active and control passes to 278 to complete the data transfer in the next cycle without halting the DSP.

Step 274 sends a "DMA request" signal to the DSP requesting a halt. Until the DSP is halted, the DMA acknowledge signal remains inactive and step 276 loops back to step 274. When the DSP halts, and a cycle steal occurs, the DMA acknowledge signal is activated, and control passes through step 270 to step 278 which gates the address bus in. For an I/O write command, step 280 then gates the data in for writing into the location designated by the I/O address. Step 282 then gates the IWCR bits 0,1 to the DSP for read/write control to the data store. Steps 284 and 286 then complete the bus interaction by gating the "gate ready" signal to the bus and dropping the "select feedback" signal. During a read operation, step 288 gates the IWCR bits 0,1 to the DSP and step 290 gates the data being read onto the data bus out. Step 290 is then followed by steps 284 and 286. In summary, the delayed halting has several advantages. It provides a greater throughput by not stopping or halting the DSP just to move data to and from the DSP. It also achieves a balanced throughput allowing a greater control of the resources. Program task duration is controlled tighter due to the time the DSP is halted. Real-time processing can be handled because the processor is not stopped, and guaranteed bandwidth is now possible with dissimilar devices.

DSP MEMORY MAP

Figure 6:
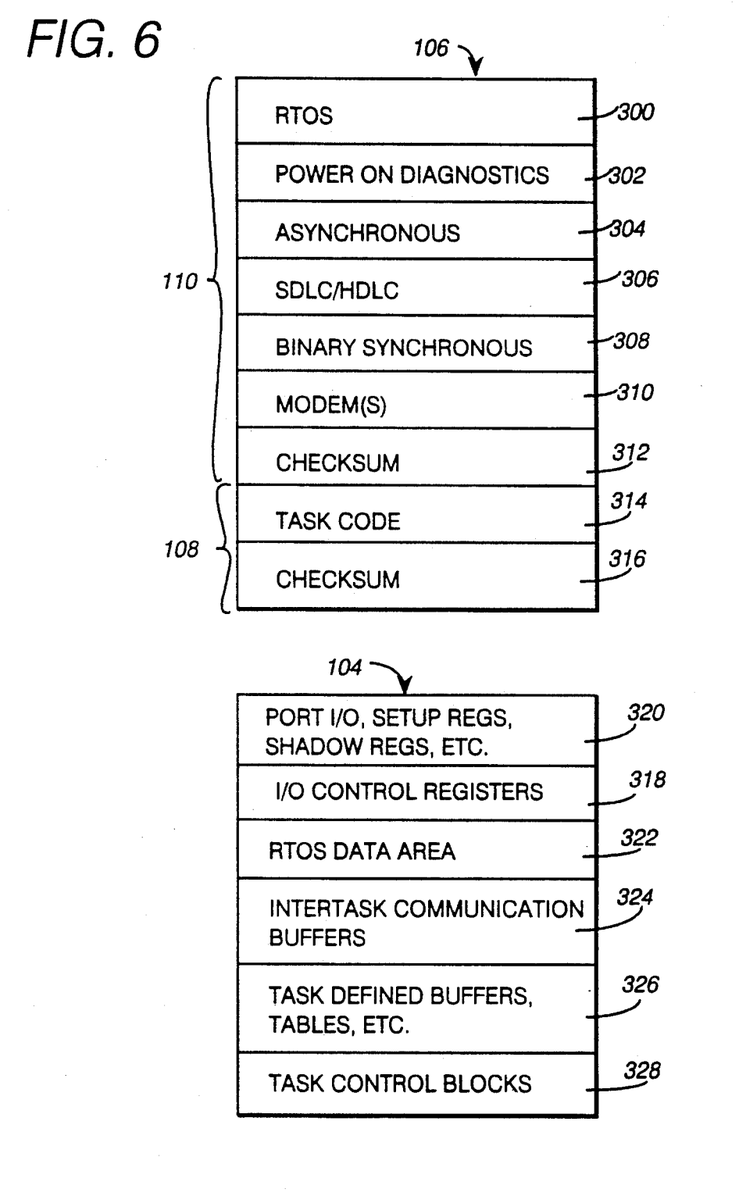
FIG. 6 is a memory map of the DSP memory.

With reference to FIG. 6, ROM 110 of instruction store 106 generally holds the instructions, programs, code for functions and tasks that are used by or in connection with other tasks or programs tailored to or defining specific tasks for functions of each different ASH. ROM 110 includes a real-time operating system (RTOS) 300, a power-on diagnostics program 302, and various communications protocols including asynchronous 304, SDLC/HDLC 306, binary synchronous 308, and different modem protocols 310. A checksum program 312 is also stored in ROM 110. Instruction store RAM 108 contains the code for different tasks which code is loaded therein by the PC or host. "PC" is used herein as a relative term to refer to that part of the personal computer system outside of DSPSS 64.

Data store 104 stores mapped I/O control registers 318, shadow registers, port I/O, set up registers, etc. 320, RTOS data area 322, intertask communication buffers 324, task defined buffers, tables, etc. 326, and task control blocks (TCBs) 328. The shadow registers are addressable locations for emulating the normal addressable registers located in a functional device, the emulation being accomplished by software so as to provide a low cost alternative to using actual hardware registers. Because such registers are emulated by software, they can be reconfigured and altered to suit the requirements of a particular function or changes in the hardware being emulated.

RTOS

Figure 7:
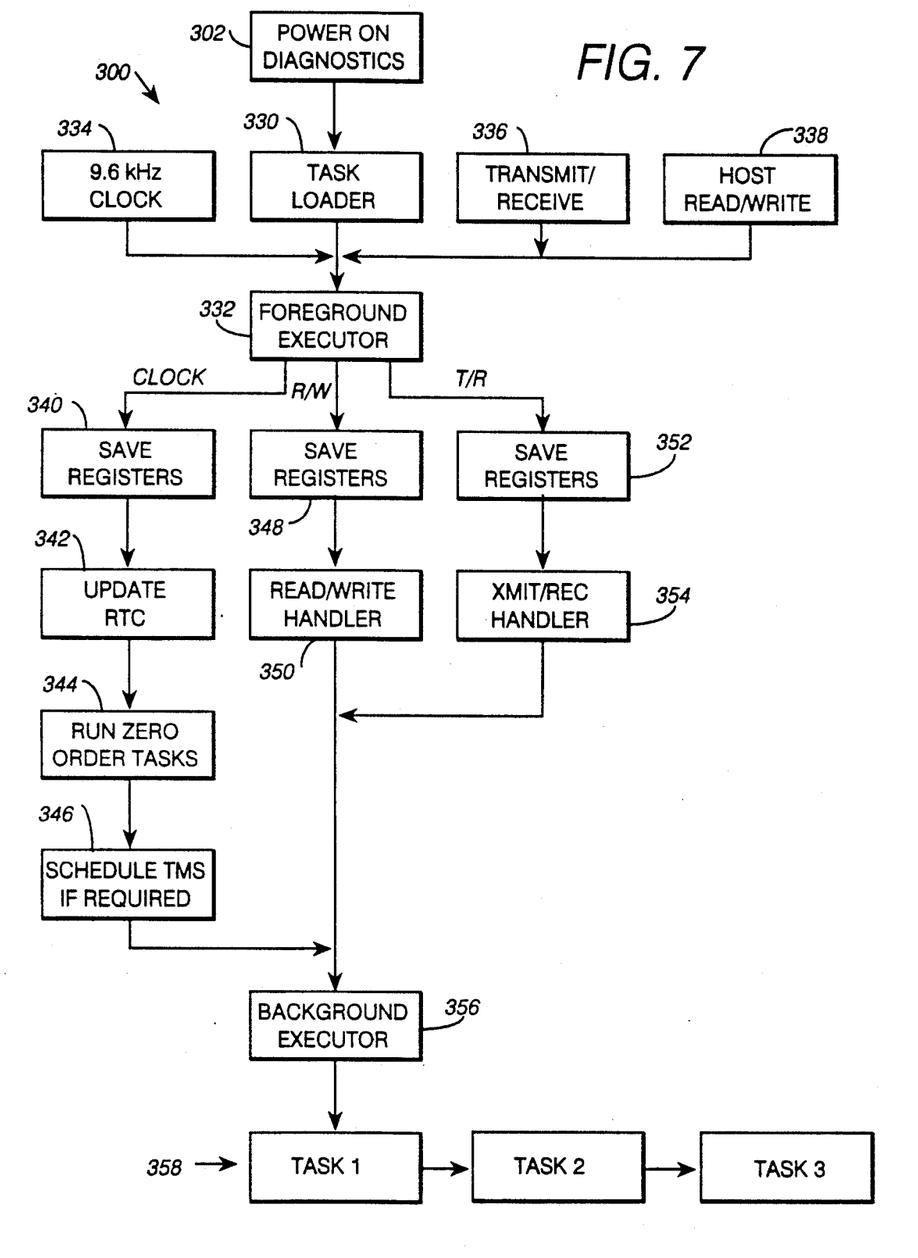
FIG. 7 is a block diagram illustrating the DSP operating system.

Referring to FIG. 7, in response to power being turned on, a diagnostics progam 302 is run. Upon successful completion of program 302, a task loader 330 then loads the various task programs to be run into RAM 108. Control then passes to a foreground executor 332.

The system also includes a scheduling clock 334 which operates at 9.6 Khz and generates on every clock "tick" an interrupt signal that invokes the foreground executor. The executor is also invoked in response to I/O transmit and receive commands 336, and read and write commands 338. Executor 332 then transfers control along one of three different paths dependent upon how it was invoked. For all three paths, the first steps 340, 348, and 352 are to save the contents of the DSP registers by storing the contents thereof in the task control block of the task being interrupted. In response to a clock tick, after the registers are saved by 340, code 342 updates the real-time clock to schedule tasks. The real-time clock is a 16-bit counter that is incremented by the sample rate scale factor of 5 at each sample clock interrupt. Hence it spans a time interval of 1.365 seconds. 'OOOO'X is the smallest RTC value and 'FFFF'X is the largest. Then, any zero order tasks are run or executed by step 344. Next, a time management system (TMS) 346 is scheduled as required, and control passes to a background executor 356 to run the tasks in task queue 358. The TMS is a zero-order RTOS task with a fully relocatable instruction segment and data segment. TMS has a dummy TCB at a known memory location. This dummy TCB serves as the anchor point of all the real-time tasks which are linked in an unordered (non-prioritized) forward manner to the dummy TCB. TMS is a RTOS utility task which serves to insert real-time tasks into the execution queue.

When invoked, TMS runs through the unordered linked list, comparing each task's COUNT against the current COUNT of TMS itself. When the COUNT of the task is found to be equal to that of TMS, it is updated by adding the task's FRAME to it. Then, TMS inserts the task into the prioritized execution queue according to this updated COUNT. TMS sets INTFLAG of the task's TCB equal to −1 to indicate that the task is linked to the execution queue and is ready to go.

The execution queue always has the task with the smallest COUNT at the top of the queue and those tasks with successively larger COUNTs toward the bottom of the queue. The task to be inserted is placed into the execution queue based on its updated COUNT value in comparison to the COUNT of the other tasks already in the queue. In case the inserted task has the same COUNT as a task which is already in the queue, it will get inserted after it. Thus, tasks which have the same COUNT will be executed by executor 356 in the same order in which they are linked to TMS.

When TMS encounters its own TCB in the unordered circular list, it branches to end TMS operation for this processing frame. The least updated COUNT value of all tasks on the TMS unordered list is taken as the next COUNT of TMS itself.

A typical RTOS environment may include several functions running concurrently, each comprised of a moderate to a large number of tasks and subtasks. Usually, most of them will be synchronous real-time tasks which can be grouped into equal FRAME and initial COUNT classes of synchronous tasks. All of these tasks are linked to the TMS task. This would create a severe loading of the processor each time such a group has to be placed into the execution queue, since TMS load is proportional to the square of the number of tasks being inserted.

This severe limitation is circumvented by the use of a QMS utility task. QMS is a special TMS task which manages only homogeneous groups of synchronous real-time tasks. Thus, instead of linking such a group directly to TMS, they are linked to QMS in the same manner. In turn, QMS is linked to the TMS task as a single real-time task. Therefore, when this group of homogeneous tasks are inserted into the execution queue, TMS only has to insert a single task with a minor computational load. When QMS reaches the head of the ordered execution queue and commences execution, it starts to load its linked real-time tasks into execution serially, according to the order in which they are linked. It is the same order as if they had been inserted into the execution queue by the TMS task directly. When the list is exhausted, i.e., the next task is QMS itself (circular QMS list), QMS terminates as any RTOS task by returning to the background executor according to the BGXRTN contents.

In order to allow the proper operation of QMS, two fields in the TCB are reserved. These are TCBSAVE and RTNSAVE. They are required to guarantee that when a QMS is being interrupted by a higher order real-time task, it can restore TCBPTR and BGXRTN contents later, since to RTOS it seems that the active task is QMS while the TCBPTR content reflects the fact that a QMS linked task is actually executing. When this task completes execution, it does not return to BGX but rather to the QMS environment. To implement this function, QMS resets the content of BGXRTN. Hence, RTNSAVE is used to retain the current return address of the task which will be reloaded into BGXRTN when the machine context will be restored. It should be noted that when QMS is interrupted the saving of registers is into QMS's TCB and not into the TCB of the actual task running. Thus, a QMS linked task can use all its TCB space starting from the REGSAVE field.

The QMS concept allows one to realize practical modular and hierarchical structures of tasks, while maintaining a very low, almost constant, RTOS overhead. QMS can be considered as a master task which links "subroutine-like" tasks into a complete application. This results in an extremely low RTOS overhead, compared to the traditional realization where all TCBs are directly linked to TMS. Programmers are encouraged to use QMS whenever possible to reduce RTOS overhead. RTOS supports one QMS per port. Thus, tasks can only have one set of synchronous real-time subtasks.

If executor 332 is invoked by a read/write command, a read/write handler 350 is executed after the registers have been saved by 348. Handler 350 sets up control blocks for DMA. If executor 332 is invoked by a transmit/receive command, a transmit/receive handler 354 is executed to handle interrupts from such things as communications hardware. Upon completion of handlers 350 and 354, executor 356 is then run. Background Executor 356 is responsible for invoking the task on top of the execution queue as well as its proper completion by removing it from the queue and loading the next task in line. Executor 356 executes in the foreground, but it is responsible for calling tasks into execution that run in the background.

When a task completes execution, it returns to executor 356 which then enters the foreground to guarantee it cannot be interrupted and removes such task from the execution queue. Executor 356 then uses BGXNEXT of the deleted task's TCB to call the next task on the queue into execution by placing it on top of the queue. The currently invoked task is always on top of the execution queue.

When a task is being called into execution, executor 356 checks the INTFLAG of its TCB. If INTFLAG is positive (i.e. 1) the task was interrupted. In this case, the registers are restored from the REGSAVE area of the TCB. The task is then given control at the location saved in INTSAVE of the TCB. If INTFLAG is not positive (i.e. 0 or −1) the task is given control at the instruction address found in SIA of the TCB.

At the bottom of the execution queue, following all real-time tasks, are any non-real-time task. Non-real-time tasks run only when all the real-time tasks are finished and the execution queue no longer has real-time tasks. When non-real-time tasks complete execution they return to executor 356 and are removed forever from the execution queue. These tasks run only one time.

Figure 8:
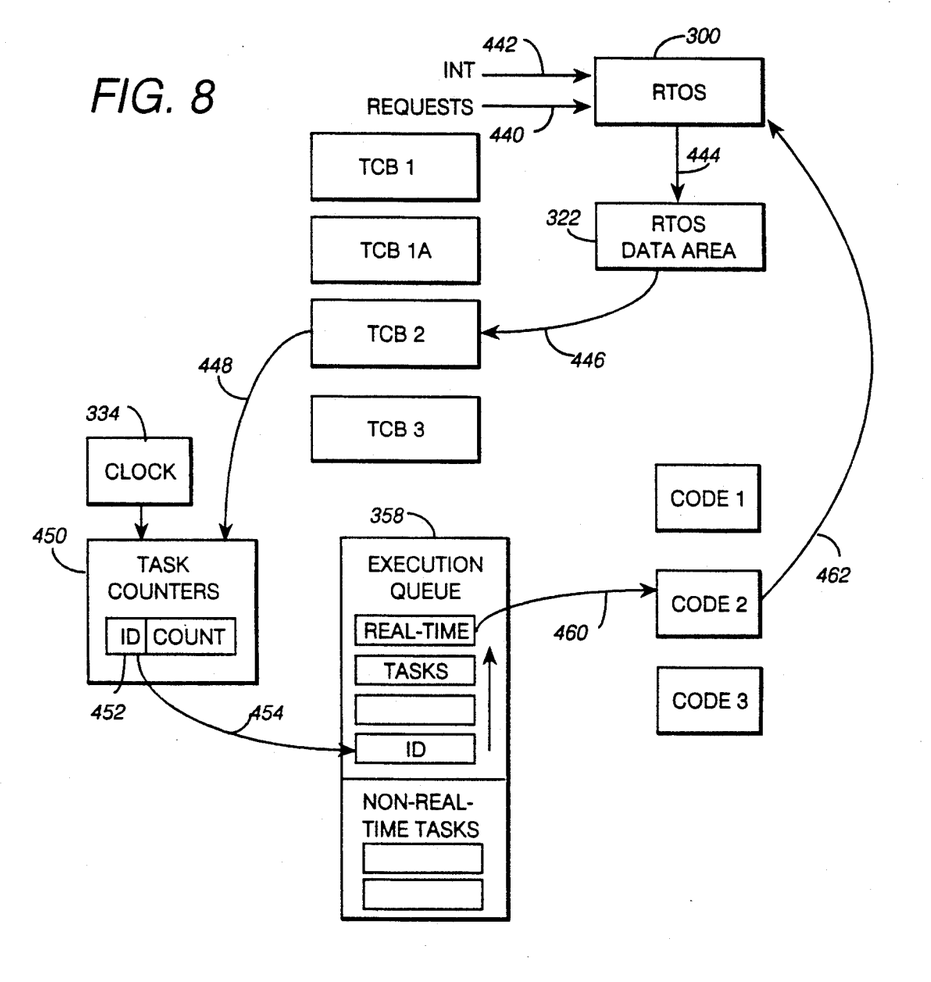
FIG. 8 is a flow diagram illustrating DSP multitasking operations.

Referring to FIG. 8, during operation of the system, RTOS 300 is responsive to PC requests 440 and to interrupts 442 to perform multitasking in the following general manner. The request or interrupt identifies the task to be performed and RTOS 300 accesses by step 444 the RTOS data area 322 to look up the address in the data RAM of the specific TCB for the task. Thus, assuming the desired task ID is "2", TCB 2 is accessed by step 446 and a frame counter 452 is setup in a frame counter storage area 450 by step 448. Frame counter 452 includes a COUNT field that is decremented in response to each tick of clock 334. When the count reaches zero, step 454 then places task 2 in execution queue 358 in accordance with the priority of the task relative to other real-time tasks in the queue. Queue 358 includes both real-time and non-real-time tasks, the latter being executed when there are no real-time tasks remaining in the queue. Tasks are dequeued and executed from the top of the queue and as each one is dequeued, the remaining real-time tasks are moved towards the top to await their turn. When task 2 reaches the top of the queue, and upon completion of the prior task or expiration of its allotted time, task 2 is then executed by transferring control by step 460 to the actual code 2 that performs the task. When task 2 completes execution, step 462 informs RTOS 300.

RTOS 300 is comprised of tasks ordered in an execution queue 358 which is managed by background executor 356. Each task in the RTOS environment is either active or inactive. Active tasks are periodically scheduled for execution, inactive tasks are not. An inactive task can only be activated by another task. Each task has a Task Control Block (TCB) stored at a predetermined location in data store 104. The TCB provides system information about the task and a limited number of user links to other tasks' TCBs.

Active tasks are either real-time or non-real-time. Real-time tasks are executed periodically and are categorized as synchronous real-time tasks when the period is fixed, or as asynchronous real-time tasks when the period varies. Non-real-time tasks are executed only once and are always asynchronous. Execution queue 358 contains both real-time and non-real-time tasks, ordered according to the task's relative priority. Priority is determined by the time to the next execution instant. Those tasks that have the least amount of time prior to the next execution instant will gain the highest priority on the queue. Non-real-time tasks which do not have a definite time frame in which they must complete their execution, are placed at the end of the execution queue.

"Function" refers to a functional program written to run under control of RTOS 300. Functions may be further divided into smaller modules called "tasks". Groups of tasks may implement functions such as communications protocols, math coprocessor calculations, modems, data encryption, voice synthesis, voice encoding, or any other function that can be off-loaded to improve performance of the PC or host system. Each task and subtask corresponds with a different TCB. Each TCB contains information used by RTOS for different purposes. The primary information germane to the multitasking functions of the invention are the following fields which are stored at the same predetermined locations in each TCB:

The Task Control Block provide system information about the task and also provides an I/O area for use in intertask communications. There must be at least one TCB for each task. However, if the task is broken up into several subtasks there must be one TCB for each subtask.

Each task program or code contains a program header defined as follows:

TASK ID This must be the first parameter of the program. It is used by RTOS to identify the task.

NUMBER OF SUBTASKS Indicates the number of TCBs associated with the task. Used by RTOS to initialize data ram with the program TCBs.

ADDRESS OF NEXT TASK Pointer to Header of next task or End of Tasks. Used by RTOS to quickly search instruction ROM for tasks during program SETUP.

Each TCB contains the following fields or information:

BGXNEXT Pointer to next task's TCB on the execution queue.

TMSNEXT Pointer to next task's TCB on Task Manager's list

SIA Pointer to task start instruction. RTOS passes control to the task at this location. If desired, the task can change this pointer to dynamically pass control to different sections of code within a task.

FRAME Frame is the scheduling rate of the task. Its value is equal to the number of hardware sample clocks desired between scheduling multiplied by a Sample Rate Scale Factor of 5. For example, if a programmer wants to schedule a task for execution every 16 sample clocks, the correct FRME value would be 80, (16×5). A count of zero is used to indicate a zero-order task. Zero-order tasks are not scheduled but instead run every sample clock. The programmer should avoid zero-order tasks if at all possible. If zero order-tasks are absolutely required, the programmer should make them as short as possible. Only one zero-order task is allowed per port/task. If more than one is encountered by RTOS, only the last one is run and all others are discarded.

COUNT The current count for the task. This count indicates the absolute count for the next scheduling the task for execution. The Task Manager adds FRAME to the count each time the task is scheduled. For example, to schedule a task for execution on the first sample clock the initial count value would be 5. Subsequent scheduling is dependent on the FRAME value.

INTFLAG Used by the Task Manager to indicate the interrupt state of the Task. A task is either idle, interrupted, or on the execution queue.

STATE Used by the Task Manager to indicate whether a task is active, requested to become inactive (transient), or inactive. There are three distinct states that a task can be in when resident in the DSP subsystem. First, a task may be active. An active task has the STATE flag of its TCB equal to zero. Its COUNT is never less than the COUNT of TMS and its COUNT is perfectly divisible by the sample rate scale factor, with no remainder. Second, a task may be active but has been requested to become inactive by another task. In this state, the STATE flag of its TCB is equal to one. This second state is transient. As soon as the task has completed execution within its FRAME time, the background executor sets its STATE equal to two, translating the task into the third distinct state, inactive. The only way for a task to enter the third state is from the second state. There is one major reason why a task must be allowed to complete execution before becoming inactive. It is possible that the task was in an interrupted state when the request came for inactivity. If the task were reactivated at some later time, beginning at the top of its code or restoring from an interrupted state, no guarantee could be made that the task would continue normally. For example, a variable might take on a transient state during a task's block time and then be restored to a steady state. Thus, restarting from the top of the code could cause a problem. Tasks that are inactive can be reactivated by setting the STATE flag of its TCB to zero.

REGSAVE Place to save task registers when task is interrupted.

INTSAVE Place to save instruction address when task is interrupted.

LINKS User defined links. The user can make use of these locations in any manner desired.

TCBSAVE Place for QMS to save pointer to current TCB.

RTNSAVE Place for QMS to save background executor return address.

INTHAND1 Pointer to Transmit Interrupt Handler

INTHAND2 Pointer to Receive Interrupt Handler

INIT Pointer to beginning of initialization code.

IBUFSIZE Input buffer size.

OBUFSIZE Output buffer size.

INBUFF Pointer to input buffer.

OUTBUFF Pointer to output buffer.

QMS Indicates whether the task should be added to the QMS. The FRAME and COUNT for the QMS TCB are loaded from the TCB of the last task with QMS equal to one. The frame and count of the previous QMS tasks are ignored.

TASKCOM Area for use by subtask to communicate with other subtask within the same task.

WORKAREA Work area for use by task for any purpose desired.

INTERRUPTS

As previously indicated, DSP 90 has eight interrupt signal lines INT0-INT7. Each interrupt line is assigned a predetermined function. RTOS 300 handles all INT0 (sample clock) and INT1 (PC read/write) interrupts. INT0 is driven by clock 334 and is used by the RTOS to schedule tasks for execution. INT1 is driven by the PC system bus. An interrupt INT1 occurs each time the PC reads or writes memory 104. INT1 is used to signal the instant when data is available from or data can be transferred to the PC application program. Interrupts INT2-INT7 are used to transmit and receive data and are handled by the tasks themselves. Entry points to the task's interrupt handlers are contained in the TCB.

The transmit and receive interrupts are enabled only for those ports that have an interface card installed. When a transmit interrupt occurs, the task is given control at the location pointed to by INTHAND1 of the TCB. For receive interrupts the task is given control at the location pointed to by INTHAND2. The task interrupt handlers get control with the processor in foreground mode. These interrupt handlers must execute an absolute minimum of instructions and return to background, by executing a BLEX instruction, in order not to disrupt the task switching functions of RTOS. At no time are tasks allowed to manipulate the interrupt mask bits of the MCRL. Interrupt level assignments are:

INT1 Interrupt Handling

Level 1 interrupts are used to signal the DSP that the PC has read from or written to one of the DSP I/O registers. Interrupts are allowed to occur if the arm interrupt bit is set and the Read Interrupt Enable Bit or the Write Interrupt Enable Bit or both are enabled in the Last Command Reg. There is one register for each port.

When the system is powered on, the RTOS disables DSP level 1 interrupts and passes control to the ports' initialization code, where level 1 interrupts for that port are enabled. When a level 1 interrupt occurs, RTOS saves the ILR for return to the interrupted task, saves R0, R1, R4, and MCRH to provide registers for use by the interrupt handler, reads LCR 123 to determine which port caused the interrupt and then passes control to that port's interrupt handler in foreground mode. The interrupt handler remains in foreground and must execute the absolute minimum of code and return to RTOS. This code should only input or output PC data. Any data processing must be performed by other routines while executing in background mode.

The port's interrupt handler is responsible for managing all activities pertaining to it's level 1 interrupt control. The RTOS will simply pass control to the proper interrupt handler with the port ID contained in R0 and the Last Command Reg contents in R4.

INT2-INT7 Interrupt handling

Interrupts on Levels 2 through 7 are handled by the task running on that particular port. The task provides an entry point to its interrupt handlers in the TCB. When a task consist of subtasks the interrupt entry points must be identical in all subtask TCBs.

When an interrupt occurs RTOS saves the ILR at absolute data store location ILRSAVE and then passes control to the task at the entry point specified in the TCB. The port ID is passed in R0. The interrupt handler then processes the interrupt, exits the level, and returns control at the location saved in ILRSAVE.

It should be apparent to those skilled in the art that many changes can be made in the details and arrangements of steps and parts without departing from the scope of the invention as defined in the appended claims.

What is claimed is:

1. A personal computer comprising:
   a main memory for storing application programs:
   a first processor for executing said application programs;
   a plurality of application specific hardware (ASH) devices;
   a general purpose digital signal processing subsystem (DSPSS) connected to said ASH devices; and
   bus means interconnecting said first processor, said main memory, and said DSPSS;
   said DSPSS comprising
      a plurality of ports connected to said ASH devices for transmitting analog signals and digital signals between said ASH devices and said DSPSS,
      converter means for converting said analog signals into digital operands,
      an instruction store connected to said DSP for storing a plurality of signal processing tasks for execution by said DSP,
      a data store connected to said DSP and to said bus means so that said DSP and said first processor can independently access said data store, said data store being further connected to said ports and to said converter means for storing said digital operands and said digital signals,
      a digital signal processor (DSP) for processing said digital signals and said digital operands, said DSP comprising an arithmetic logic unit and a multiplication unit for executing tasks to process said digital operands and said digital signals, and
      control means connected to said DSP for operating said DSP and concurrently executing a plurality of said signal processing tasks in response to execution of said application programs by said first processor;
   said control means comprising
      a scheduling clock for generating a plurality of scheduling interrupts at fixed time intervals;
      a plurality of task control blocks (TCBs) stored in said data store, there being a different TCB associated with each task, each TCB containing a plurality of fields for storing, for the associated task, 1) a frame defining a scheduling period between successive scheduling of said associated task, 2) a scheduling count defining when the associated task is to be next scheduled, 3) DSP information for restoring said DSP when an interrupted task is next executed, and 4) an instruction address at which to begin initial execution of said associated task;
      a background executor for maintaining a queue of tasks scheduled for execution;
      a foreground executor that is periodically executed in response to said scheduling interrupts for scheduling said tasks, said foreground director including means for 1) saving DSP information from a task being interrupted, 2) searching said unordered list of TCBs to find a TCB whose count field has reached a predetermined value, 3) adding the task associated with such TCB, to said queue of tasks, 4) updating said count field, in said TCB of the task added to said queue, by adding said frame to said count, 5) ordering said tasks in said queue according to which tasks have the lowest counts in said TCBs associated therewith, with the task having the lowest count being at a head of said queue, and 6) passing control to said background executor;

said background executor including means, operative in response to receiving control from said foreground executor, for passing control to said task at said head of said queue for execution thereof, for removing said task from said queue upon completion of execution thereof, and for passing control to the next task in line in said queue when another task has completed execution.

2. A personal computer in accordance with claim 1 wherein said foreground director comprises means for first saving DSP information from a task being interrupted in response to read/write commands and to transmit/receive commands, and for then passing control to handlers for such commands.

3. A personal computer in accordance with claim 1 wherein each TCB further comprises a pointer field containing an address at which to resume execution of an interrupted associated task, and an interrupt field for indicating that the associated task has been interrupted; and said background executor includes means for transmitting said DSP information to said DSP from the TCB associated with the task at the head of the queue, and for passing control to the task at the head of said queue by branching to said address in said pointer field of said associated TCB, when said interrupt field of such TCB indicates that the associated task has been interrupted.

4. A personal computer in accordance with claim 1 wherein said DSPSS further comprises:

a cycle counter;

analyzing means for determining whether or not said DSP is going to access said data store in an immediately succeeding cycle;

incrementing means for incrementing said counter when said analyzing means makes a positive determination;

means, operative in response to said counter reaching a predetermined count, for halting operation of said DSP after delaying for a number of cycles defined by said predetermined count, to thereby allow said data store to be accessed by;

and means for granting access to said data store in response to I/O commands from said first processor, when said analyzing means make a negative determination and when said DSP is halted.

5. A personal computer in accordance with claim 1 wherein:

said DSP includes interrupt control means for receiving a plurality of interrupts having different priority levels ranging from a lowest level to a highest level; and said scheduling interrupts, generated by said scheduling clock, have the highest level of priority.

6. A personal computer in accordance with claim 1 wherein said foreground executor is itself a task having its own TCB in which said count thereof is set to zero, and said means in said foreground executor adds another task to said queue when said count in said TCB of said another task equals said count in said own TCB.

* * * * *